(12) United States Patent
Loce et al.

(10) Patent No.: US 7,139,101 B2
(45) Date of Patent: Nov. 21, 2006

(54) ANISOTROPIC STOCHASTIC SCREEN

(75) Inventors: Robert P. Loce, Webster, NY (US); Beilei Xu, Penfield, NY (US); Shen-ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1000 days.

(21) Appl. No.: 10/285,716

(22) Filed: Oct. 31, 2002

(65) Prior Publication Data

US 2004/0085588 A1 May 6, 2004

(51) Int. Cl.
*H04N 1/405* (2006.01)
*H04N 1/409* (2006.01)

(52) U.S. Cl. ............... 358/3.06; 358/3.19; 358/3.2; 358/3.26; 358/3.28

(58) Field of Classification Search ............... 358/1.9, 358/3.06–3.09, 3.13–3.2, 3.26–3.28, 533–534; 382/270

See application file for complete search history.

(56) References Cited

U.S. PATENT DOCUMENTS

| | | | |
|---|---|---|---|
| 4,553,173 A | 11/1985 | Kawamura | |
| 4,918,622 A | 4/1990 | Granger et al. | |
| 5,111,310 A | 5/1992 | Parker et al. | 358/3.19 |
| 5,323,247 A | 6/1994 | Parker et al. | 358/3.08 |
| 5,341,228 A | 8/1994 | Parker et al. | 358/534 |
| 5,477,305 A | 12/1995 | Parker et al. | 358/3.19 |
| 5,543,941 A | 8/1996 | Parker et al. | 358/534 |
| 5,673,121 A | 9/1997 | Wang | 358/3.06 |
| 5,708,518 A | 1/1998 | Parker et al. | 358/534 |
| 5,726,772 A | 3/1998 | Parker et al. | 358/3.19 |
| 6,278,802 B1 | 8/2001 | Delabastita et al. | 382/251 |
| 6,351,319 B1 | 2/2002 | Schweid et al. | |
| 6,606,168 B1 | 8/2003 | Rylander | 358/3.09 |

FOREIGN PATENT DOCUMENTS

EP 0 963 105 A2 8/1999
EP 1482722 A2 * 12/2004

OTHER PUBLICATIONS

Meng Yao and Kevin J. Parker, "Modified Approach to the Construction of a Blue Noise Mask", Journal of Electronic Imaging, Jan. 1994, vol. 3 (1), pp. 92-97.
Theophano Mitsa and Kevin J. Parker, "Digital Halftoning Using a Blue Noise Mask", SPIE vol. 1452 Image Processing Algorithms and Techniques II (1991), pp. 47-56.

* cited by examiner

*Primary Examiner*—Scott A. Rogers

(57) ABSTRACT

A system and method for the halftoning of gray scale images by utilizing a pixel-by-pixel comparison of the image against an anisotropic stochastic screen is disclosed. The anisotropic stochastic screen comprises a non-deterministic, non-white noise function which, when thresholded, is designed to produce anisotropic dot patterns having a power spectrum characterized as having negligible low frequency components and a high-frequency region which has an absence of stronger dominant spikes.

14 Claims, 7 Drawing Sheets

ANISOTROPIC STOCHASTIC SCREEN

BACKGROUND AND SUMMARY

The present invention relates generally to systems and methods for printing, reproducing or displaying images. More particularly, the teachings disclosed herein are applicable to methods and apparatuses wherein dispersed dot halftoning is implemented.

Color is a powerful tool and has become an essential component of communication. The use of color facilitates the exchange of knowledge and ideas. Color can sway thinking, influence perceptions, change actions, and cause reactions. Similarly, the use of images is integral to communication and can be applied to a range of applications including, for example, explaining concepts and ideas, marketing goods and services, prompting responses and inspiring new ideas. The ability to faithfully reproduce images and colors is essential to communication as inaccuracies in color or poor image quality can defeat the purpose of or entirely destroy the intended communication. Those involved in the development of document processing systems or devices such as marking engines, printers, scanners, fax machines, electronic libraries, and the like to construct, produce, print, transmit, scan, store and archive documents and their constituent elements are continuously looking for ways to improve the accuracy and total image quality of their products.

Digital images are commonly represented as one or more separations, with each separation conventionally represented as a monochromatic bitmap, which may be described as an electronic image with discrete signals (hereinafter, pixels) defined by position and density. Monochromatic images typically are represented with a single separation while color images and documents commonly are represented as two or more separations with each separation comprising a set of color density signals for a single primary or secondary color. In monochromatic and color applications, density is described as one level in a number of possible states or levels. When more than two levels of density are used in a separation, the levels are often termed "gray", indicating that they vary between a maximum and minimum, and without reference to their actual color.

Common input devices including document scanners, digital cameras and computer imagery generators are capable of describing an image with a large number of gray levels, with 256 levels a commonly selected number, although larger and smaller levels are possible. In such systems, image density signals are commonly represented as continuous tone (contone) pixels, varying in magnitude from a minimum to a maximum, with a number of gradations between corresponding to the bit density of the system. Thus, a common 8-bit system provides 256 density levels or shades of color for each separation.

Within a stage of the printing process of many printing devices, the potential image signal gradations are reduced to a limited number of possibilities, and are commonly binary, e.g., they either produce a dot or not at a given location. This quantization resolution reduction is due to the physical processes involved are binary in nature or have been restricted to binary operation for reasons of cost, speed, memory or stability (e.g., ink jet printers, old binary CRT displays, laser xerography). Thus, given a color separation with 256 possible density levels or shades of color, a set of binary printer signals must be produced representing the contone effect. This process is referred to as halftoning.

Generally, in a halftoning operation, each pixel value in an array of contone pixels over a given area of the separation is compared to one of a set of preselected thresholds (the thresholds may be stored as a dither matrix and the repetitive pattern generated by this matrix is considered a halftone cell) as taught for example in U.S. Pat. No. 4,149,194 to Holladay. The effect of such an operation is that, for a given area of the image, some of the thresholds in the matrix will be exceeded, i.e., the image density level of the pixel value at that specific location is larger than the value stored in the dither matrix for that same location, while others are not. In the binary case, the pixels or cell elements for which the thresholds are exceeded might be printed, while the remaining elements are allowed to remain white or unprinted, dependent on the actual physical quantity described by the data. Since the human visual system tends to average out rapidly varying spatial patterns and perceives only a spatial average of the micro-variation in a printed area produced by a printer, the halftone process described above can be used to produce a close approximation to the desired color of that area in the contone input.

The dither matrix of threshold values is often referred to as a "screen", and the process of generating the binary image from the contone image using the screen is called "screening". Conventional digital halftones start as a number of isolated dots which grow bigger as more colorant is requested on the paper. These screens are referred to as clustered-dot screens. The fundamental spatial rate at which the dots in a clustered dot screen are repeated is commonly referred to as the screen's spatial frequency. The higher the screen spatial frequency, the finer and smoother appearing the image and also the greater is the capacity for the dots to represent fine detail in the image.

Dithering creates problems in color document reproduction where the repeating pattern of a screen through the image, when superposed over similar repeating patterns in multiple separations, can cause undesirable image artifacts, particularly in a printing system with less than ideal registration between separations. For example, it should be appreciated that dithering can cause "subject moiré," wherein a period component in the image subject content beats, or interferes, with a screen frequency as well as color-to-color moiré, where the screens from different separations beat.

Dispersed dot screens are one alternative to conventional clustered dot screens. Dispersed dot screens are designed such that as the image density increases and more colorant (printed dots) is added, the added dots are not necessarily constrained to be adjacent to other each. Thus, instead of producing dots that grow in size with increased colorant on paper, dispersed dot methods grow in number and produce a well-dispersed pattern of isolated dots at spaced pixel locations. Dispersed dot screens generally provide higher spatial resolution than comparable clustered dot screens. Another advantage of dispersed dot screening over conventional cluster dot is the suppression of moiré.

One option for dispersed dot screening attempts to create a smooth dither pattern by locating dots within any specific intensity pattern such that they are spread as uniformly across the screen as possible. A recursive algorithm that produces such an optimal dither (the dots are as far apart as they can be at each level) is taught by R. E. Bayer, "An optimum method for two level rendition of continuous-tone pictures," *Proc. IEEE International Conf. on Communications, Conference Record*, pp 26-11–26-15. More particularly, the Bayer screen has threshold values that are arranged such that when thresholded against increasing levels of density, the halftone dots are placed as far as possible from the other dots used to render lower density levels. However, images produced using such an "optimally smooth dither pattern" can be filled with objectionable patterns. Additionally, Bayer dispersed dots have many frequency components and, thus, the potential to beat with subject frequencies. A second option for implementing dispersed dot screens, uses a dither matrix wherein the dots are randomly scattered across the screen. However, use of a "truly random" screen such as would be representative of uniformly distributed and uncorrelated spectrum generally results in rather poor image quality.

Stochastic screening is an implementation of dispersed dot screening that combats the image artifacts associated with Bayer type screens and truly random screens. A stochastic screen contains dots with a random nature, and its halftone patterns can be less visible than structured halftone patterns produced by traditional clustered dot screens. In stochastic screening, the screen is neither truly random nor optimally smooth but rather is designed to produce patterns with pleasant noise characteristics. The pleasant noise characteristics are achieved by designing the screen so as to distribute the noise energy in the region of high spatial frequencies, where the human visual system has a significantly reduced sensitivity. Such uncorrelated, high frequency noise is often referred to as blue noise. Blue noise patterns have the desired aperiodic, uncorrelated structure of white noise without low frequency graininess. See, e.g., *Digital Halftoning*, R. A. Ulichney, MIT Press, Cambridge, Mass. 1987, (fifth printing, 1996).

Conventionally, stochastic screens have been designed such that the screen replicates a blue noise pattern as described above. A stochastic screen having a blue noise pattern traditionally is defined to mean a type of binary pattern produced after thresholding a gray-scale image (i.e., dot pattern) that has negligible low-frequency components and further possess the properties of isotropy and aperiodicity, which, when expressed in terms of the radially averaged power spectrum, has small or negligible low-frequency components, a transition region, and a high-frequency region which has an absence of stronger dominant spikes. That is, the dot pattern must have a collection of properties that must essentially include aperiodicity, isotropy (or low anisotropy), and lack of low-frequency graininess (i.e., dot patterns having a reduced number of dots per unit area). In this respect, a conventional stochastic screen has specific design goals as described above. That is, a stochastic screen is designed such that the power spectrum of the blue noise pattern has a small or negligible low frequency component and a high-frequency region which has an absence of dominant spikes and the resulting dot pattern (i.e., the image resulting from a screening process) is aperiodic, isotropic, and devoid of low-frequency graininess.

Information on designing and using a stochastic screen known as a blue noise mask can be found in a family of patents to Parker et al., including U.S. Pat. Nos. 5,111,310 and 5,477,305 which are herein incorporated by reference. The blue noise mask of Parker et al. meets the design goals for stochastic screens described above. More particularly, the family of patents to Parker et al. teach constructing an blue noise mask such that when thresholded at any level, the resulting dot profile is a locally aperiodic and isotropic binary pattern with small low-frequency components, which in the halftoning literature, is known as a blue noise pattern. Additionally, U.S. Pat. No. 5,673,121 to Wang, discloses a stochastic halftone screening method for designing an idealized stochastic screen and is herein incorporated by reference as it discloses a particular stochastic screen useful in implementing one or more embodiments of the invention, as will be more fully explained below. The idealized stochastic screen design method of Wang also provides classical stochastic screen representing blue noise.

Conventional stochastic screens with the design methods and goals of the prior art provide good image quality. Stochastic dots tend to be used in printing where either a very high frequency response is needed or you wish to avoid subject moire or color-to-color moire. They have found significant use in ink jet printing where the isolated dots are repeatable and thus local density is predictable and controllable. However, such conventional stochastic screens do not exploit the improvements in electrostatographic printing machines that have provided the ability to consistently and accurately produce small isolated dots using techniques such as high addressability, pulse width pulse position modulation (PWPM) or the like, and improvements in stability and uniformity of the marking processes. In such cases, and in many lithographic printing settings, it is possible to accept some degree of lowered stability (compared to clustered dots) to acquire the advantageous properties of high spatial resolution, and moire resistance. Thus, in accordance with the teachings below, there is described a method for halftoning an image using an anisotropic stochastic screen.

In one embodiment, the anisotropic stochastic screen generates a dot pattern that has an anisotropic power spectra while retaining the desirable characteristics of negligible low-frequency components and a high-frequency region which has an absence of stronger dominant spikes. Beneficially, the anisotropy achieved using a screen constructed of anamorphic pixels which can be obtained using conventional writing techniques such as high addressability, PWPM, or the like. One advantage of the present teachings is that the use of such anisotropic dots produces a screen with higher frequency content than conventional stochastic screens employing isotropic dots. Additionally, the teachings herein describe an anisotropic stochastic screen that achieves good dispersion of printed dots, results in an output image with good spatial frequency characteristics, and possess acceptable image quality.

In accordance with another embodiment disclosed herein, there is provided a method for halftoning an image by comparing a pixel of image data to a threshold level signal from a set of halftone threshold signals comprising a screen of anamorphic pixels, each threshold signal within the set of halftone threshold signals corresponding to an anamorphic pixel within the screen generating an output signal according to the comparison of the halftone threshold signal to the image data.

In accordance with another aspect of the teachings herein, there is provided a method of halftoning gray scale images by utilizing a pixel-by-pixel comparison of the image against an anisotropic stochastic screen, the anisotropic stochastic screen comprising a random non-deterministic, non-white noise function that, when thresholded, is designed to produce anisotropic dot patterns having a power spectrum characterized as having negligible low frequency components and a high-frequency region which has an absence of stronger dominant spikes.

In accordance with another aspect of the teachings herein, there is provided an apparatus for halftone image information, comprising a memory storing an anisotropic stochastic screen, the anisotropic stochastic screen including a set of halftone threshold level signals, each threshold signal corresponding to a unique location in a halftone cell and a comparator receiving a pixel of the gray scale image and one of the halftone threshold signals from the memory and producing an output signal according to the comparison of the halftone threshold signal to said image signal; wherein the anisotropic stochastic screen is comprised of a non-deterministic, non-white noise function which, when thresholded, produces an anisotropic dot pattern having a power spectrum characterized as having negligible low frequency components and a high-frequency region which has an absence of stronger dominant spikes.

BRIEF DESCRIPTION OF THE DRAWINGS

The drawings are provided for purposes of illustrating the embodiments disclosed herein and are not to be construed as limiting the invention.

DETAILED DESCRIPTION

Figure 1:
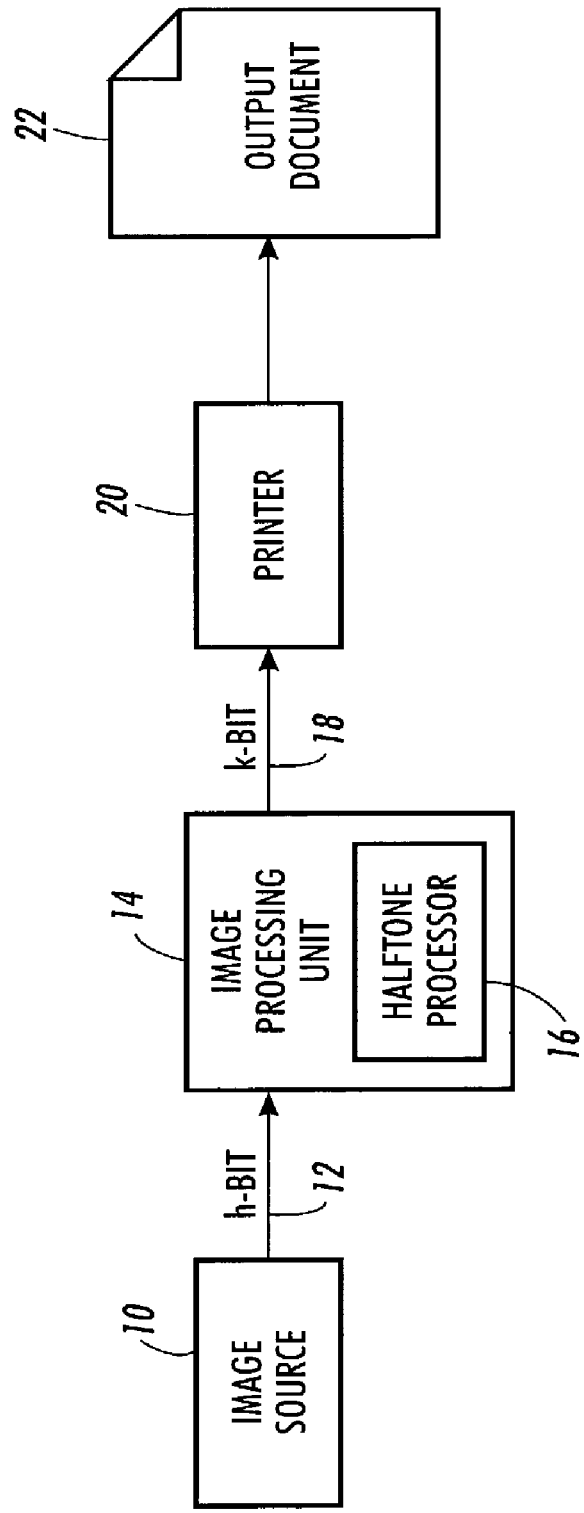
FIGS. 1 and 2 illustrate a general representation of a suitable system for generating a halftone image in accordance with the teachings herein.

Referring now to the drawings wherein the showings are for purposes of illustrating the embodiments disclosed herein and not for limiting same, there is disclosed a method of halftoning an image using an anisotropic stochastic screen. In this description, as well as in the drawings, like reference numbers represent like devices, circuits, or circuits performing equivalent functions.

Turning now to FIG. 1, there is shown an embodiment of a digital imaging system that incorporates one or more features of the embodiments disclosed herein. The imaging system includes image source 10 which may include a computer, a network, a scanner, a digital camera or any similar or equivalent image input device providing an electronic representation of an original image or document in the form of image signals 12. Image signals 12 are supplied to an image processing unit 14 to be processed so as to produce image data 18 that is suitable for reproduction on image output terminal (IOT) or printer 20.

In the course of processing image signals 12, image processing unit 14 commonly converts the image signals into a format comprising multiple separations each of which comprises an array of h-bit pixels, if image signals 12 are provided in different format. Image processing unit 14 commonly includes halftone processor 16 which converts the h bit per pixel digital image signals to k-bit image data 18, suitable for driving a particular IOT where k is an integer value and commonly with k=1. It is also well within contemplation to derive images electronically from image signals in the format of a page description language describing the appearance of the page. In such a case, the image processing unit might include a processing element for decomposition of the page.

In response to image data 18, IOT 20 generates an output document 22 on suitable media (e.g., print or display). IOT 20 may beneficially comprise an electrostatographic (e.g., electrophotographic, ionographic) printer; however, the printer may include such equivalent alternatives as a solid ink printer, and ink jet printer, thermal printer, etc. Furthermore, it should be appreciated that system may be used to drive electronic display systems such as CRTs, LCDs, LED, etc.

Figure 2:
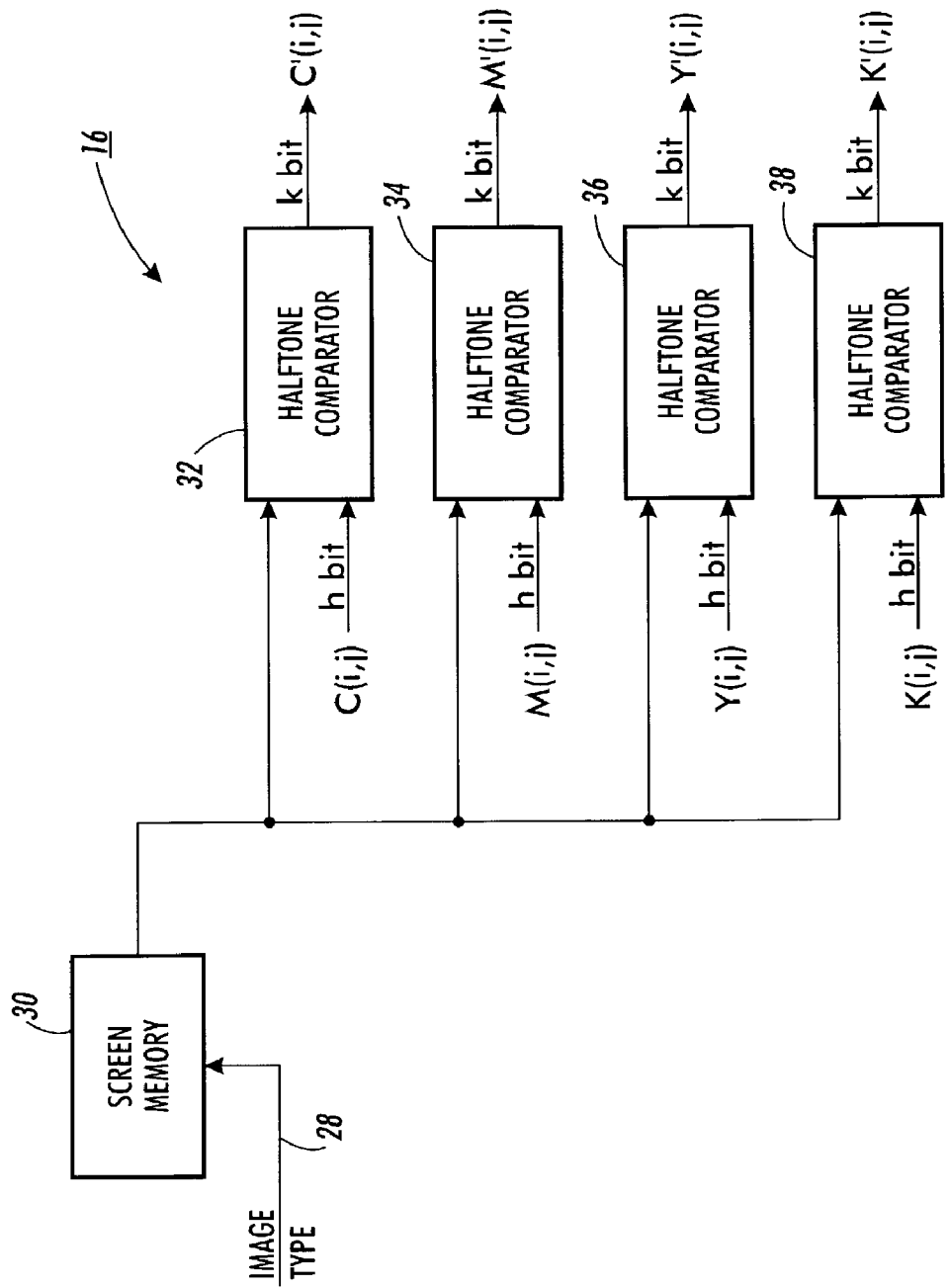

Referring now to FIG. 2, there is shown the operational characteristics of halftone processor 16. In this example, there is illustrated a color processing system, using four separations, e.g., Cyan(i, j), Magenta(i, j), Yellow(i, j) and blacK(i, j), each of which is processed independently for halftoning purposes to reduce an h-bit input to a k-bit output. Although shown as operating on color image data comprising four separations, it will be appreciated that the principles described herein are equally applicable to color reproduction utilizing a different number of separations as well as to "black and white" or monochromatic reproduction utilizing a single separation.

Halftone processor 16 operates in a conventional manner performing a simple pixel by pixel comparison of a gray scale input against thresholds at corresponding locations in a screen array. In the halftone processor of FIG. 2, there is shown screen memory 30 comprising a source of screening information. Screen memory 30 provides a halftone screen to each comparator 32, 34, 36 and 38, where the other comparator input is an h-bit separation. The output is k bits per pixel, which can be directed to a printer. Those skilled in the art will readily recognize that screen memory 30 may supply the same halftone screen to each comparator or different screens to the comparators. Screen memory 30 may further include input 28 providing an indication of the image type (e.g., pictorial, photographic, graphic, text, portrait, nature scenes, scanned high frequency halftone magazine images, scanned low frequency halftone newspaper images, etc.) to be processed. In response to such an input, memory 30 may supply screens optimized for the identified image type.

Now, consider the screen array in generating halftoned images from continuous tone gray-scale inputs. As discussed above, the use of stochastic screens (e.g., blue noise masks) provides good image quality and exhibits robustness when using an output device capable of accurately producing small isolated dots. However, as indicated above, conventional stochastic screens fail to fully exploit output devices such as printing machines that consistently and accurately produce small isolated anamorphic dots using techniques such as high addressability (HA) printing, or pulse width pulse position modulation (PWPM).

To address the above, there is described herein a halftoning operation using an anisotropic stochastic screen. In one embodiment, the anisotropic stochastic screen retains the desirable blue noise characteristics of negligible low-frequency components and a high-frequency region which has an absence of stronger dominant spikes but possesses an anisotropic power spectrum. Beneficially, an anisotropic screen can be designed using the same techniques developed for as for conventional screens with the anisotropy being achieved using a screen constructed of anamorphic dots obtained using conventional writing techniques such as HA printing or PWPM. More specifically, a procedure for designing a screen with conventional, isotropic pixels can be used to obtain an anisotropic screen by adjusting the distances to account for the smaller size of the anamorphic pixel in one dimension in the design process. Alternatively, the process begins with a convention screen designed for isotropic pixels and scales the screen for use with anamorphic pixels.

Anamorphic pixels can be used to control a "grain size." That is, a key consideration is the smallness of the "on" event exposing the imaging surface. The "on event" size affects the visual "grain size," which is desirable to be as small as possible for visual desirability, while, at the same time, being large enough to be stable and repeatable. That trade-off between visual grain size and stability is controlled through the HA or PWPM and it yields jointly optimized visual graininess and stability.

Briefly, HA printing may refer to an imaging method wherein the imaging device can position the writing spot and expose the imaging surface to generate anamorphic dots or pixels having position precision finer than the size of the writing spot. For example, a typical 600 spot per inch (spi) laser printer operating as a high addressable printing system may employ a writing spot having an addressability of 600/inch in the direction perpendicular to beam scanning direction (also referred to as "cross-scan direction" or "process direction"), and a width and addressability of 4800/inch in the direction of the beam scan (also referred to as "fast-scan direction"). That is, the device may be operated to modulate the writing spot to provide 4800 anamorphic dots ("on" events) per inch. Additionally, a printer may operate to modulate a writing spot in two dimensions. That is, the 600 spot per inch (spi) laser printer may be operated as high addressable printing system providing addressability of 1200 spi in the cross-scan direction and 2400 spi in the fast-scan direction. It should be appreciated that the above examples are provided to illustrate the concept of high addressable printing and that other combinations and variations of addressability in one or both directions can be obtained. Systems operating in an HA mode typically regulate a laser or similar writing device using clock modulation, amplitude modulation, pulse width position modulation, pulse-width modulation or equivalent procedures.

Turning now to the design of an anisotropic screen, one process begins with the design of an isotropic stochastic screen. In one embodiment, an isotropic stochastic screen is obtained using the method described in U.S. Pat. No. 5,673,121 to Wang, incorporated by reference above. The method optimizes screen spatial frequency characteristics to maximize the distance between pixels at each gray level G and using an iterative process that minimizes a merit function such as is given by $Q_G = \Sigma d^2_{opt}/d^2_{12}$ wherein $d_{opt}$ is the optimal distance between pixels and $d_{12}$ is the distance between two given pixels. Briefly, the process taught by U.S. Pat. No. 5,673,121 includes (a) initially assigning a set of threshold signals varying across a range of gray levels to locations in a screen matrix, each threshold signal defined by value and position in the matrix; (b) selecting at least two threshold signals in the screen matrix; (c) characterizing the uniformity of distribution of spots through the halftone screen cell; (d) swapping the two threshold signal positions in the screen matrix; (e) recharacterizing the uniformity of distribution of spots through the halftone screen cell; (f) as a function of the recharacterization, either maintaining the threshold signals in the swapped positions of the halftone screen or otherwise returning the threshold values to the initial positions; and (g) iteratively repeating a preselected number of iterations, steps (b) through (f). For purposes of this description, a stochastic screen generated in accordance with the method of U.S. Pat. No. 5,673,121 will be referred to as a "classical stochastic screen."

Returning to the "classical stochastic screen" of U.S. Pat. No. 5,673,121, the principle of design will be discussed in more detail. Consider generating halftone images from constant gray-scale inputs by a screen matrix with N elements. If the overlap between adjacent pixels is ignored, the screen cell with n black pixels and N−n white pixels simulates the input with a gray scale (g) equal to g=(N−n)/N, where $0 \leq n \leq N$, or $0 \leq g \leq 1$. The visual appearance of this pattern depends on whether the black pixels or the white pixels are minorities. If the black pixels are, i.e., $0.5 < g \leq 1.0$, the best visual appearance of the halftone pattern occurs when all black pixels are "evenly" distributed, in other words, each black pixel should "occupy" $1/n$, or $1/(1−g)N$, fraction of the total area of the screen. Therefore, the average distance of adjacent black pixels should be equal to $\alpha(1−g)^{−1/2}$, where $\alpha$ is independent of gray levels. On the other hand, if the white pixels are minorities, i.e., $0 \leq g \leq 0.5$, each white pixel should "occupy" $1/(N−n)$ or $1/gN$, fraction of the total area and the average distance of adjacent white pixels should be equal to $\alpha g^{−1/2}$. An idealized stochastic dithering screen is defined as a threshold mask generating halftone images which satisfy above criterion for all gray levels.

If the input gray-scale images are specified by integer numbers, G(x, y), where $0 \leq G \leq M$, the dithering screen should have M different threshold values spanning from zero to M−1. If it is further assumed that at each level there are (N/M) elements having the same threshold value T, the stochastic screen should distribute the threshold values T so that the resulting halftone images are as close as possible to the ones generated by an idealized stochastic screen.

Choosing an arbitrary pair of pixels from the dithering screen, assume that the threshold values for these two pixels are $T_1=T(x_1, y_1)$ and $T_2=T(x_2, y_2)$, respectively, where $(x_1, y_1)$ and $(x_2, y_2)$ are the coordinates of these pixels. Dithering a constant input G yields outputs $B_1=B(x_1, y_1)$ and $B_2=B(x_2, y_2)$ having the following possible combinations:
1. $B_1=1$ and $B_2=1$, if $G \geq T_1$ and $G \geq T_2$;
2. $B_1=0$ and $B_2=0$, if $G<T_1$ and $G<T_2$;
3. $B_1 \neq B_2$, where B=1 represents a white spot and B=0, a black spot for printing Under case 3, where one output pixel is black and another is white, their distance is irrelevant to the visual appearance according to the criterion discussed above. For case 1, consider the difference between the two situations:
1a. if $M/2 \geq G$, $G \geq T_1$, $G \geq T_2$;
1b. elsewhere.

Under case 1a, both output pixels are white, and white spots are minorities. Therefore, the corresponding distance between $(x_1, y_1)$ and $(x_2, y_2)$ is relevant to the visual appearance of the halftone images. According to the analysis above this distance is greater or equal to $\alpha g^{−1/2}$, or $\alpha(G/M)^{−1/2}$, for outputs of an idealized stochastic screen. Among all G under case 1a, the critical case of G is the smallest one, or $G_c=\text{Max}(T_1, T_2)$, which requires the largest distance between the two pixels $(x_1, y_1)$ and $(x_2, y_2)$.

Similarly, when both dots appear as black dots, the visual appearance under the following cases must be considered:
2a. if $G \leq M/2$; $G>T_1$ and $G>T_2$
2b. elsewhere.

Among all G under 2a, the largest G is given by $G_c=\text{Min}(T_1, T_2)$, which requires the largest distance $\alpha(1−G_c/M)^{−1/2}$ between $(x_1, y_1)$ and $(x_2, y_2)$.

Mathematically, one can use a merit function $q(T_1, T_2)$ to evaluate the difference between the idealized stochastic screen and the chosen one. For example, one can use the following choice:

$$q(T_1, T_2)=\exp(-C \cdot d^2/d_c^2), \quad (1)$$

where C is a constant; $d^2=(x_1-x_2)^2+(y_1-y_2)^2$; and $d_c^2 = M/[M-\text{Min}(T_1, T_2)]$, if $T_2 > M/2$ and $T_1 > M/2$,
$d_c^2 = M/\text{Max}(T_1, T_2)$, if $T_2 \leq M/2$, and $T_1 \leq M/2$,
$d_c^2 = 0$, i.e., q=0, elsewhere.

Since a dithering screen is used repeatedly for halftoning images larger than the screen, for any chosen pair of pixels from the dithering screen the closest spatial distance in corresponding halftone images depends on the dithering method and should be used for the merit function. The overall merit function should include contributions of all possible combinations. In one embodiment the summation of q($T_1$, $T_2$) was for optimization, i.e., $$Q = \Sigma q(T_1, T_2), \text{ where } \Sigma \text{ for all } (x_1, y_1) \neq (x_2, y_2). \qquad (2)$$

The design of stochastic screens then becomes a typical optimization problem. When the threshold values of a chosen screen are rearranged, the merit function can be evaluated to determine the directions and steps. Many existing optimization techniques can be applied to this approach. The simplest method is to randomly choose a pair of pixels and swap threshold values to see if the overall merit function Q is reduced, Since only those q values related to the swapped pair need to be recalculated, the evaluation of Q does not consume significant computation time.

As provided above, an anisotropic screen can be designed using the same techniques developed for as for conventional stochastic screens with the anisotropy being achieved using a screen constructed of anamorphic dots obtained using conventional writing techniques such as high addressable printing or PWPM. That is, having obtained a convention stochastic screen designed with isotropic pixels, the screen can be scaled and printed with anamorphic pixels at various resolutions to yield a power spectrum possessing a high anisotropy measure. The dot patterns generated by printing the screens at various resolutions can be compared and evaluated to determine the desired output resolution. Factors considered when evaluating the various dot patterns may include overall image quality, low-frequency graininess, stability, etc. As should be appreciated, when designing the screen, the tradeoff is made between the use of smaller anamorphic dots which will minimize visual "graininess" and the use of larger dots which tend to produce more stability.

As indicated above, the optimal size of the anamorphic pixels be determined via print tests. For example, density measurements can be made on repeated prints for different grain size. The minimum grain size that produces acceptably repeatable density for a given subject would be used. One possible criteria would be that the color difference $\Delta E$ should not vary by more than a first amount within a page, and page to page it should not vary by more than a second amount. For example, in the CIE Lab color space, the criteria may be that within a page the color difference should not vary by more than 4, and page to page it should not vary by more than 8 for subject matter that has complicated structure. It should be appreciated that the above criteria is provided as one example of many possible criteria. For example, in addition to or as an alternative to the color difference, one may choose to compare the components of the color difference separately.

The above process can be repeated across several sample images from several image types to determine the optimal event size of the anamorphic pixels for a given printer. Alternatively, an optimal event size can by determined individually for each image type or group of image types. Furthermore, a system can provide a set of screens corresponding to available anamorphic pixels sizes (e.g., 2×, 4×, or 8× high addressability) from which a user can select to use for generating a given image or image type. In such as case, the user can use the screens to determine the optimal even size for the given image or image type.

Figure 3:
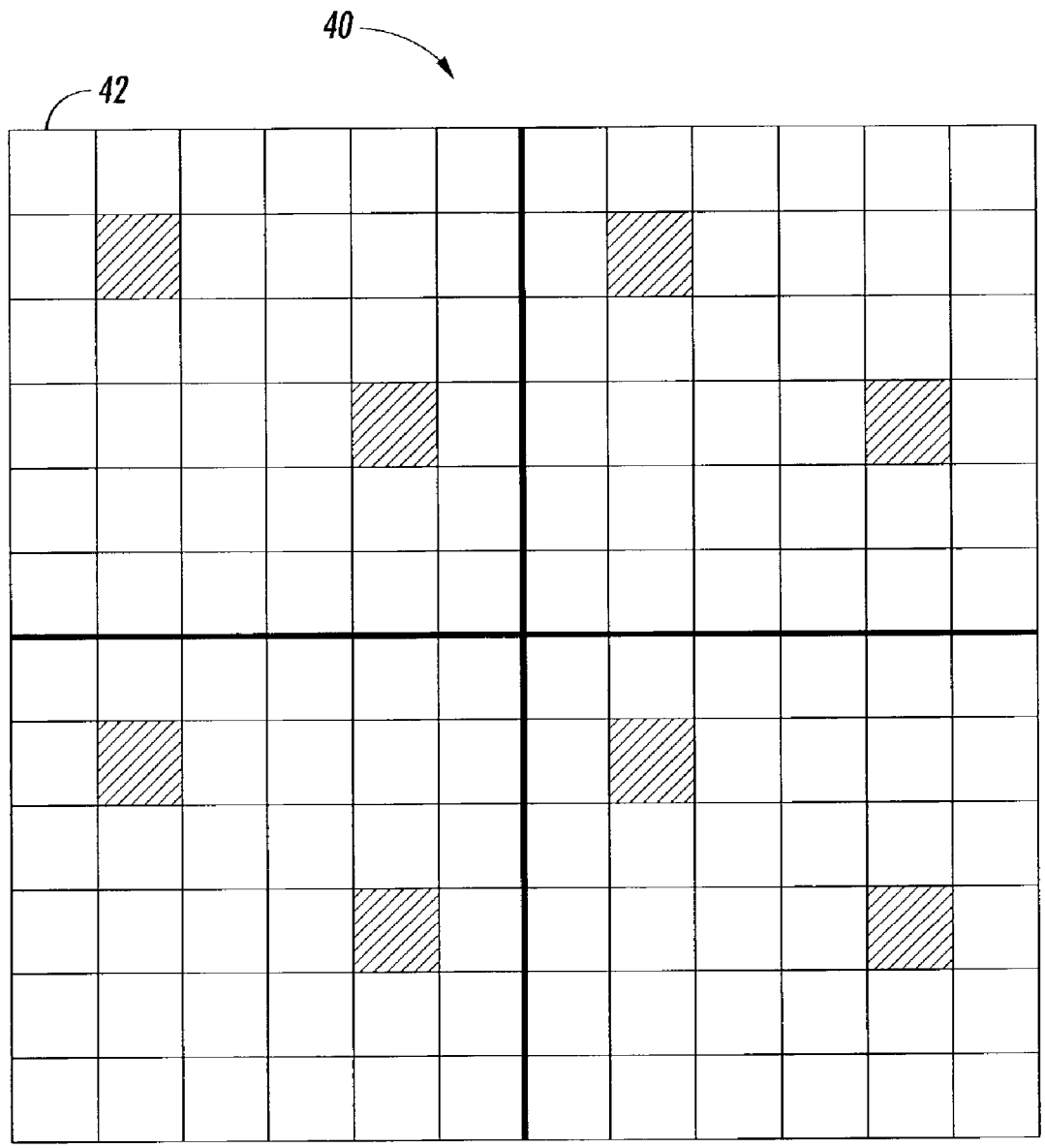
FIG. 3 shows a highlight for a given image area created with four isotropic stochastic cells.
Figure 4:
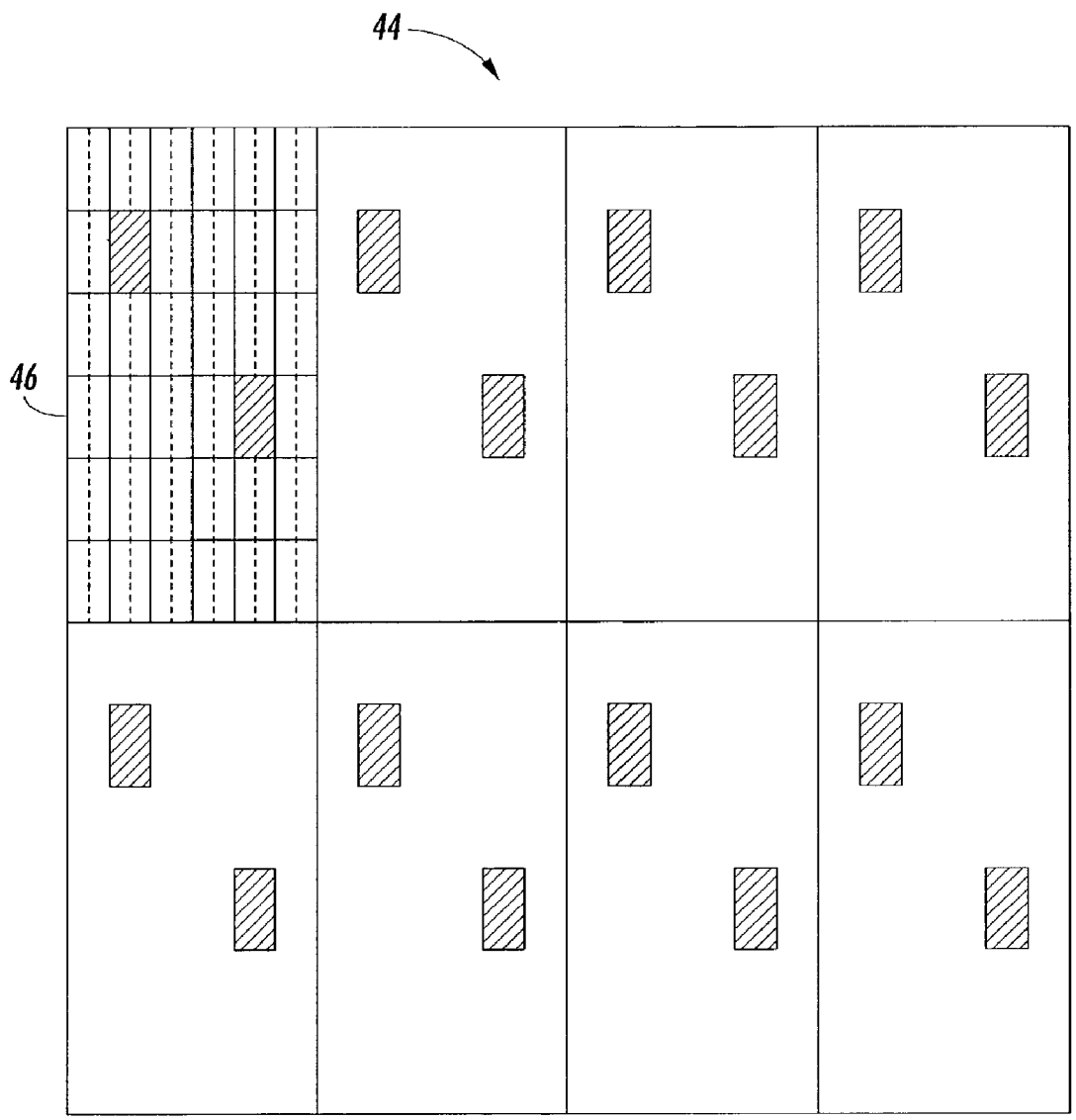
FIG. 4 shows a highlight for the same image area of FIG. 3 created with eight anisotropic stochastic screens.

For example, given a typical 600 spot per inch (spi) laser printing device operating as a high addressable printing system may employ a writing spot having an addressability 4800×600 spi, an isotropic screen of interest at is designed at 600×600 spi can be printed at with anamorphic pixels of 4800×600, 2400×600 and 1200×600 spi to determine the desired or optimal "on" event size for the anamorphic pixel. FIGS. 3 and 4 illustrate the use of a classical stochastic screen and an anisotropic stochastic screen to create a highlight for a given gray level across a portion of an image. More specifically, FIG. 3 shows a portion of a dot pattern 40 for a given image area having a constant gray level produced using a classical stochastic. In FIG. 3, the dot pattern 40 for the image area was created with four conventional isotropic stochastic cells 42 each filled with 2 dots to create a highlight. FIG. 4 also shows the portion of a dot pattern 44 the same image area shown in FIG. 3. In FIG. 4, dot pattern 44 was created with eight anisotropic stochastic screens 46 filled with 2 dots each to produce a highlight for the same gray level. The anisotropic example shows a laser device with "high addressable pitch" of 2400×600 spi generating a dot pattern from a screen comprising anamorphic pixels at 1200×600 spi. That is, the printer provides 4× high addressability to write anamorphic pixels with the anisotropic stochastic screens and resulting dots being written at 2× high addressability. As can be seen, dot pattern 44 provides the same coverage for a given area but has a higher frequency content than dot pattern 40. The high spatial frequency content tends to produce smoother, better defined edges, and is less visible. It should be appreciated that the high addressability need not be limited to integer values nor need the adressability be greater than 1×. That is, with an addressability 4800×600 spi, one may also print anamorphic pixels of 0.5×, 0.33×, or 0.25× (300×600, 200×600, 150×600) spi or other sizes to obtain another kind of anisotropic stochastic screens for certain possible applications (e.g., a given image, image type or image source).

One aspect of above method scales the screen by factors that are integer multiples of two (e.g., 2, 4, 8). Such restrictions on the scaling can operate to provide a saving in memory requirements for halftoning devices. For example, if a device can store screens at 1×, 2×, 4×, or 8× high addressability and the event size of a stochastic screen is 1200 spi (21 micron) anamorphic pixel, then it would be a waste of memory to store it at 8× high addressability. Rather than storing the screen at 8×, it can be stored at 2× and either the pixel clock can be adjusted for 2×, or the screen can be replicated to the 8× pixel clock just prior to thresholding. In general, if an event size can be replicated to a full pixel, one can readily implement the clock adjustment pixel replication. Thus, a device developed to provide pixel data at given high addressability can be readily adapted to employ one or more anisotropic screens designed for particular applications or image types with each of the screens employing a different anamorphic pixel event size. The set screens can be stored at the event size of the anamorphic pixel to reduce memory requirements with adjustments to the pixel clock or replication of the screen prior to thresholding.

In summary, the procedure described above for designing a screen using anamorphic pixels starts with a conventional stochastic screen designed for isotropic pixels and scales the screen for use with anamorphic pixels. Alternatively, a screen using anamorphic pixels can be obtained "directly" using the process for designing a conventional stochastic screen with the appropriate adjustment all the distances to account for the smaller size in one dimension.

The power spectra and anisotropy properties of the anisotropic stochastic screen will now be discussed. Recall that the power spectrum P(f) is the Fourier transform of the autocorrelation operation. As with most aperiodic halftone screens, the autocorrelation function of the anisotropic stochastic screen is not known, so an estimate, $\hat{P}(f)$, of P(f) is used. The averaged periodogram approach (also called the Bartlett's method) is a simple but effective way to produce the estimate $\hat{P}(f)$. It should be appreciated that other methods (e.g., Welch or Blackman-Tukey) can be used to estimate the power spectrum.

Briefly reviewing, the spectral estimate, $\hat{P}(f)$, can be partitioned into annuli of width $\Delta$ with each annulus having a central radius $f_r$, the radial frequency, and $N_r(f_r)$ frequency samples. The sample mean of the frequency samples of $\hat{P}(f)$ in the annulus $||f|-f_r|<\Delta/2$ about $f_r$, is defined as the radially averaged power spectrum and is given by $$P_r(f_r) = \frac{1}{N_r(f_r)} \sum_{i=1}^{N_r(f_r)} \hat{P}(f). \quad (3)$$

Further, the unbiased variance of the same frequency samples is given by:

$$S^2(f_r) = \frac{1}{N_r(f_r)-1} \sum_{i=1}^{N_r(f_r)} \left( \hat{P}(f) - P_r(f_r) \right)^2 \quad (4)$$

from which the anisotropy of $\hat{P}(f)$ can be determine from:

$$\frac{S^2(f_r)}{P_r(f_r)}. \quad (5)$$

Because the range of anisotropy values is quite large, anisotropy is plotted in decibels. See pages 54–58 in *Digital Halftoning*, R. A. Ulichney, MIT Press, Cambridge, Mass. 1987, (fifth printing, 1996).

Figure 5:
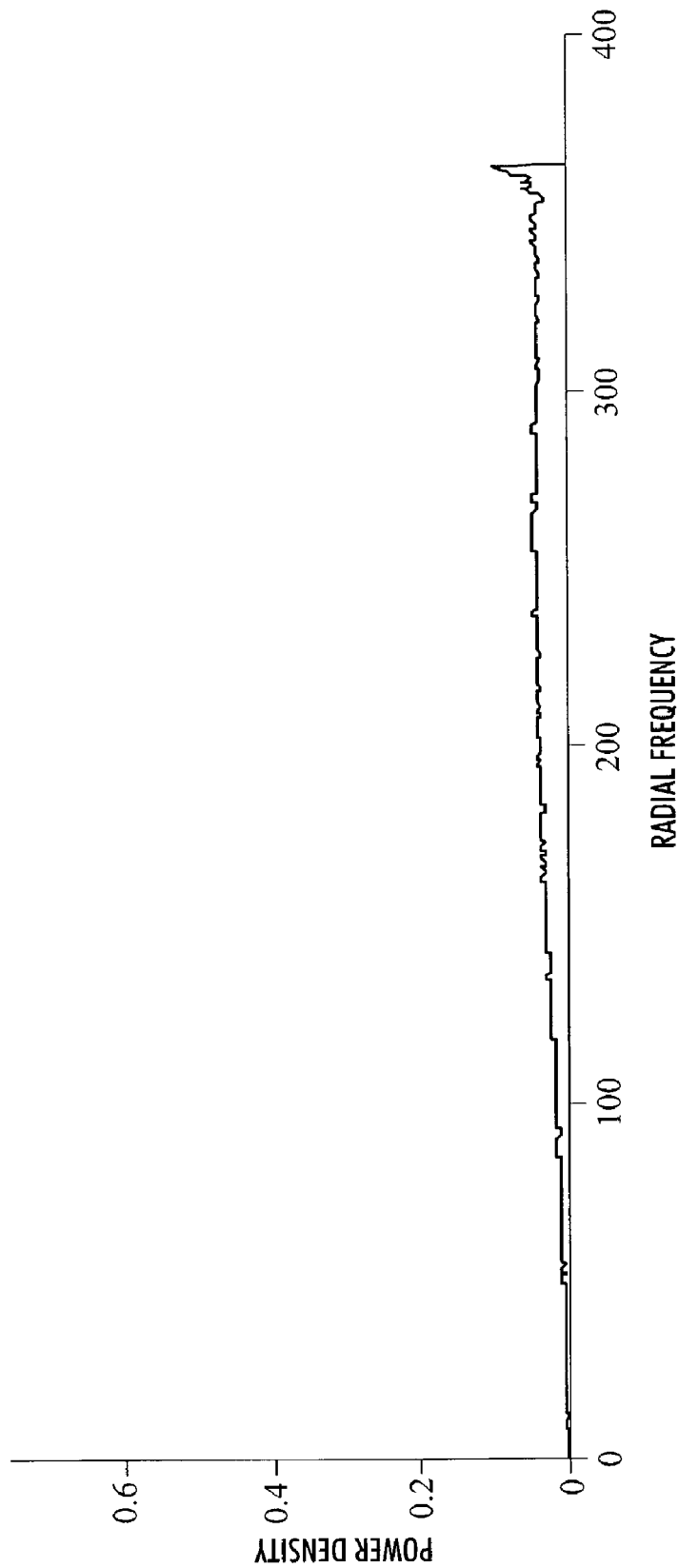
FIG. 5 illustrates a plot of an exemplary power spectrum of an anisotropic stochastic screen.
Figure 6:
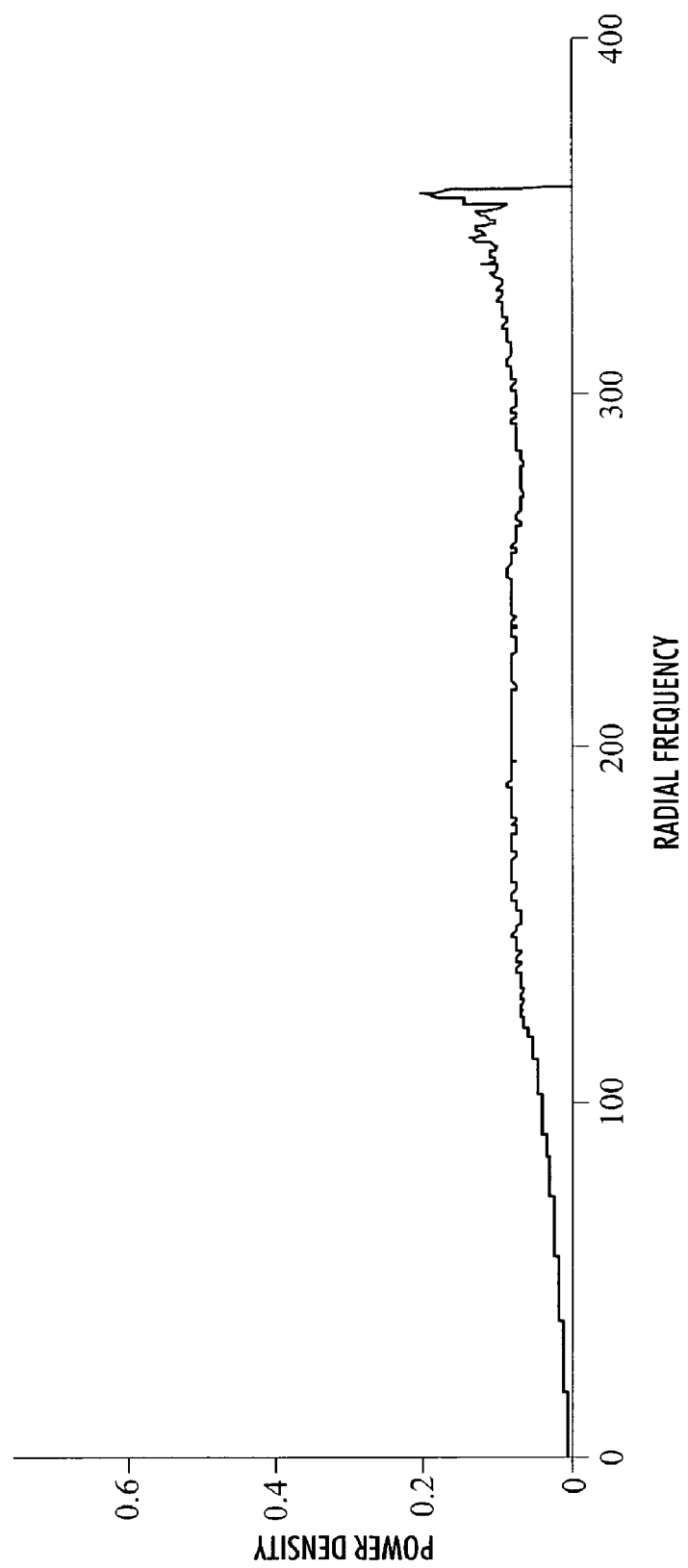
FIG. 6 shows a plot of a power spectrum of a classical stochastic screen.

Turning now to FIG. 5 there is shown a plot of an exemplary power spectrum of an anisotropic stochastic screen based upon the "classical stochastic screen" of U.S. Pat. No. 5,673,121 designed at 600×600 spi and printed at an enhanced resolution of 1200×600 spi (e.g., 2× high addressability). As can be seen from FIG. 5, the power spectrum contains negligible low-frequency components and a high-frequency region which has an absence of stronger dominant spikes. Recall that a power spectrum having negligible low-frequency components and a high-frequency region which has an absence of stronger dominant spikes is a desired trait of stochastic screens. The power spectrum of FIG. 5, compares favorably with the power spectrum of the classical stochastic screen illustrated in FIG. 6.

As discussed above, conventionally stochastic, blue noise, screens have as a design goal the production of dot patterns which are aperiodic and radially symmetric, i.e., isotropic. It has been suggested that a dot pattern can be considered to be isotropic (have low anisotropy) if the anisotropy is near or below 0 dB. See, e.g., *Digital Halftoning*, R. A. Ulichney, MIT Press, Cambridge, Mass. 1987, (fifth printing, 1996).

Figure 7:
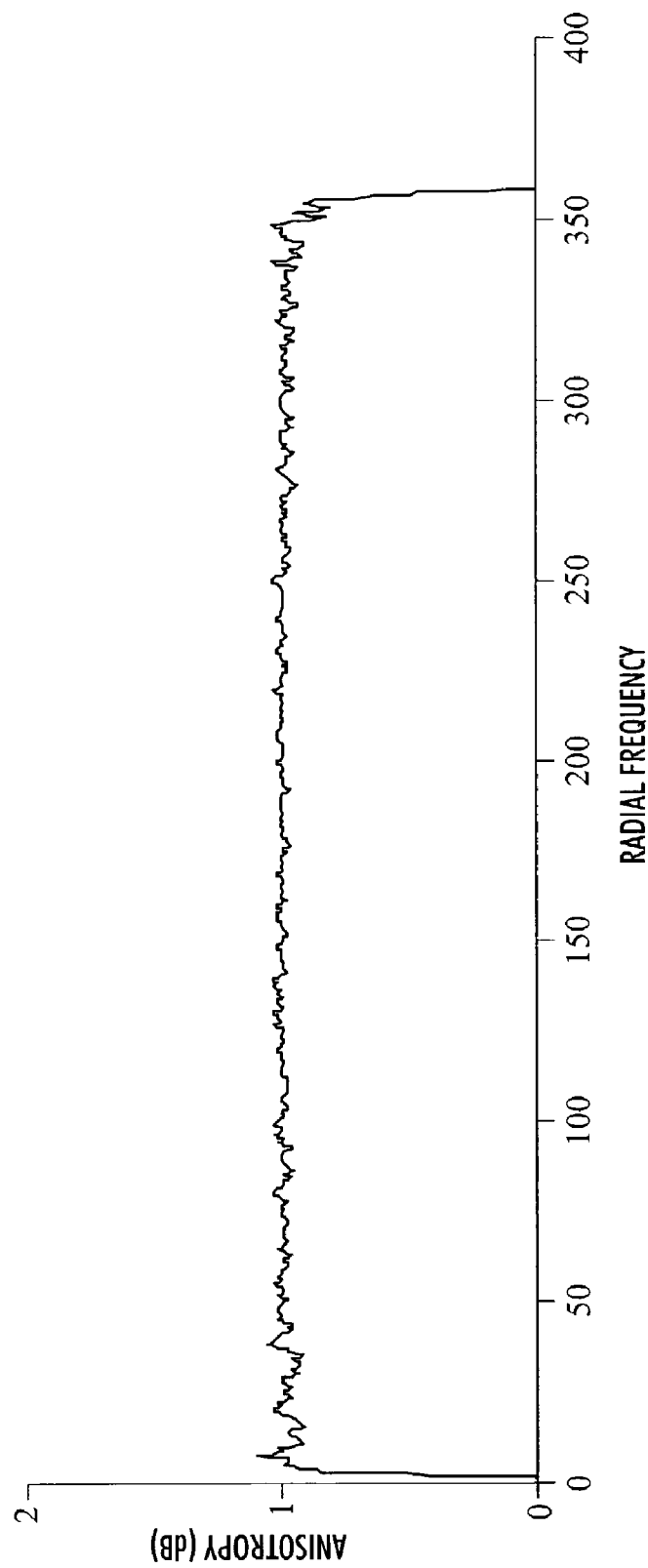
FIG. 7 illustrates an anisotropy plot of an anisotropic stochastic screen.

Furthermore, as the anisotropy measure of the dot patterns begins to approach 1 dB, the dot patterns can be considered to be highly anisotropic. FIG. 7 shows an anisotropy plot an anisotropic stochastic screen based upon the "classical stochastic screen" of U.S. Pat. No. 5,673,121 designed at 600×600 spi and printed at an enhanced resolution of 1200×600 spi (e.g., 2× high addressability). As can be seen from FIG. 7, the anisotropic stochastic screen is anisotropic which is contrary to the conventional teachings and design considerations for stochastic screens.

In summary, constructing a screen such that the distance of the "on" events is anisotropic (i.e., the events are closer in one dimension than the other) results in a power spectrum is strongly anisotropic. It is desirable to design a screen possessing this form of anisotropy if high addressability printing is available. Such desirability can be fully understood by considering (1) the frequency response and edge response of the screen and (2) frequency response of the human visual system. That is, screens possessing higher spatial frequencies can more faithfully reproduce image subject matter possessing edges and high frequency content. A printer with high addressability is capable of higher frequency patterns in one dimension versus the other. To use an isotropic screen in this printing setting would result in not using the full frequency response of the print engine to produce high frequency screens. The high frequency content and edges would not be printed as faithfully with isotropic spacing. The frequency response of one dimension would not be used to its full capability.

In addition to edge response, high frequency content (actually, minimized low frequency content) in halftone screens makes them less visible and objectionable to the observer. Forcing the screen to be isotropic in a high addressability setting does not fully utilize the frequency response of the printer to minimize the visibility of the screen. Analogous to the event size, the high frequency spacing has practical limitations. Spacings that are too small result in high frequency structures that are not well produced by some printers. So, the spacing in the two dimensions is optimized jointly for its desirable high frequency characteristics and the printer frequency response limitations.

By recognizing the above, the present invention disregards the prior teachings on isotropy, thereby allowing the production of a preferred size for "on" events as defined above as well as the production of screen with minimized low frequency content.

While the above embodiments have been described using a "classical stochastic screen," it should be appreciated that other methods for obtaining a stochastic screen can be employed. For example, the blue noise mask taught by U.S. Pat. Nos. 5,111,310 and 5,477,305 can be used an alternative to the classical stochastic screen. Briefly, a blue noise mask can be generated as follows. Starting at a first gray level with a chosen dot pattern, or "seed", the process iteratively uses a Fast Fourier Transform (FFT) techniques with a "blue noise" filter to redistribute all spots in dot pattern and eliminate large visual "clumps." Next, the dot pattern is processed at the next gray level by increasing (or decreasing) certain number of black spots on the previously determined dot pattern (existing black (or white) spots are not moved). The same filtering technique is used to distribute newly added (or subtracted) dots. The above processing is then repeated for all gray levels sequentially. At each step, the width of the blue-noise filter varies by an amount corresponding to the current gray level. The summation of dot patterns for each gray levels is the blue noise mask generated.

Moreover, while the embodiments discussed above using scaled high addressable versions of isotropic stochastic screens and blue noise masks, the present invention can apply to any one of the stochastic screens as well as other dispersed dot screens including Bayer screens.

The disclosed method may be readily implemented in software or be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

What is claimed is:

1. A method for the halftoning of gray scale images by utilizing a pixel-by-pixel comparison of the image against an anisotropic stochastic screen in which the anisotropic stochastic screen comprises a non-deterministic, non-white noise function which, when thresholded, is designed to produce anisotropic dot patterns having a power spectrum characterized as having negligible low frequency components and a high-frequency region which has an absence of stronger dominant spikes.

2. The method of claim 1, wherein the dot pattern is highly anisotropic.

3. The method of claim 1, wherein the dot pattern has anisotropy measure greater than 0.7 dB.

4. The method of claim 3, wherein the anisotropic stochastic screen is used to halftone a color image.

5. A halftone processor for converting a gray scale image comprising a plurality of m-bit pixels to a halftoned image, the processor comprising:
    a memory storing an anisotropic stochastic screen, the anisotropic sotchastic screen including a set of halftone threshold level signals, each threshold signal corresponding to a unique location in a halftone cell; and
    a comparator receiving a pixel of the gray scale image and one of the halftone threshold signals from the memory and producing an output signal according to the comparison of the halftone threshold signal to said image signal;
    wherein the anisotropic stochastic screen comprises a non-deterministic, non-white noise function which, when thresholded, produces an anisotropic dot pattern having a power spectrum characterized as having negligible low frequency components and a high-frequency region which has an absence of stronger dominant spikes.

6. The processor of claim 5, wherein the dot pattern is highly anisotropic.

7. The processor of claim 5, wherein the dot pattern has anisotropy measure greater than 0.7 dB.

8. A method for halftoning an image, comprising:
    receiving image data, the image data comprising a plurality of pixels;
    comparing a pixel of the image data to a threshold level signal from a set of halftone threshold signals comprising a screen, each threshold signal within the set of halftone threshold signals corresponding to an anamorphic pixel within the screen; and
    generating an output signal according to the comparison of the halftone threshold signal to the image data.

9. The method of claim 8, further comprising producing an anamorphic dot in response to the output signal.

10. The method of claim 8, wherein the anamorphic pixels within the screen have an addressability in the fast scan direction with respect to an addressability in the process direction of one of the 2×, 4× and 8×.

11. The method of claim 8, wherein the anamorphic pixels within the screen have an addressability in the process direction of 600 spi and an addressability in the fast scan direction of one of 1200 spi, 2400 spi and 4800 spi.

12. The method of claim 8, wherein the screen comprises a non-deterministic, non-white noise function which, when thresholded, produces a dot pattern having a power spectrum characterized as having negligible low frequency components and a high-frequency region which has an absence of stronger dominant spikes.

13. The method of claim 12, wherein the anamorphic pixels within the screen have an addressability in the fast scan direction with respect to an addressability in the process direction of one of the 2×, 4× and 8×.

14. The method of claim 12, wherein the anamorphic pixels within the screen have an addressability in the fast scan direction of one of 300 spi, 600 spi, 1200 spi, 2400 spi and 4800 spi.

* * * * *